Nov. 26, 1946. G. K. CZARNIKOW 2,411,777
IRIS DIAPHRAGM MECHANISM FOR PROJECTION LENSES
Filed Sept. 28, 1944
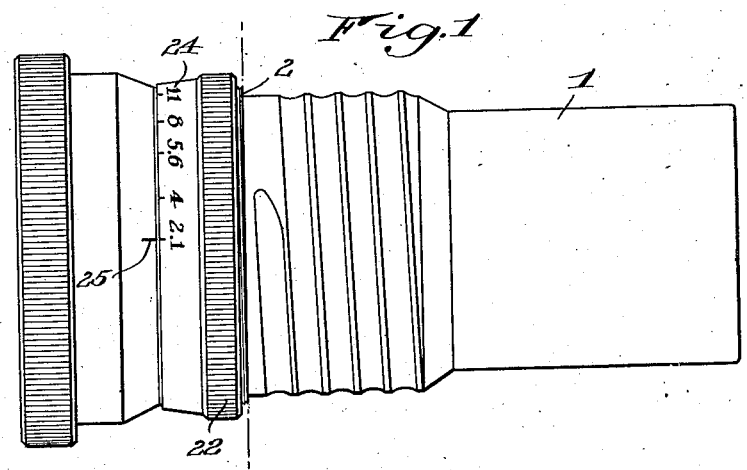
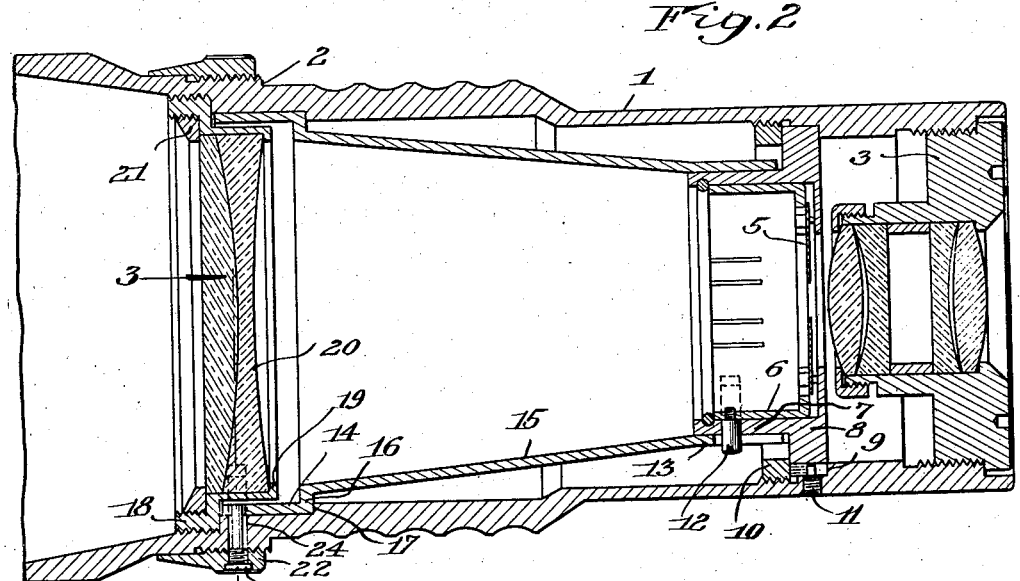
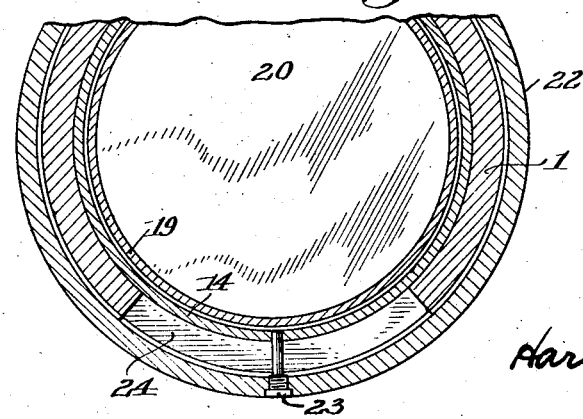
INVENTOR.
George K. Czarnikow
BY
Harold E. Stonebraker
his Attorney Patented Nov. 26, 1946

2,411,777

UNITED STATES PATENT OFFICE 2,411,777

IRIS DIAPHRAGM MECHANISM FOR PROJECTION LENSES

George K. Czarnikow, Rochester, N. Y., assignor to Wollensak Optical Company, Rochester, N. Y., a corporation of New York Application September 28, 1944, Serial No. 556,120

2 Claims. (Cl. 95—64)

This invention relates to an iris diaphragm mechanism for a projection lens and has for its purpose to provide a projection lens mount with a commercially practical and simple iris diaphragm and controlling means for regulating the intensity of light in a projection lens.

A more particular purpose of the invention is to afford an efficient and durable diaphragm operating means which can be quickly and economically assembled in a projection lens mount and easily adjusted to regulate the size of the light opening.

A further object of the invention is to provide an arrangement making it possible to position a diaphragm adjacent to the rear lens mount of a projection lens system and to control the diaphragm from a position at the front of the lens barrel adjacent to the front lens of the system.

Another purpose of the invention is to afford a construction in which the front portion of the operating member is spaced substantially endwise from the rear portion thereof and from the diaphragm, while being held firmly in proper rotatively adjustable relation to the front lens so as to permit easy movement, quick adjustment, and accurate control of the diaphragm.

Still an additional object of the invention is to provide a construction that utilizes a minimum number of parts and can be economically manufactured, while lending itself also to an easy and accurate assembly.

To these and other ends, the invention consists in the construction and arrangement of parts that will appear clearly from the following description when read in conjunction with the accompanying drawing, the novel features being pointed out in the claims at the end of the specification.

In the drawing:

Fig. 1 is a side elevation of a projection lens mount, incorporating an iris diaphragm and operating means constructed in accordance with a preferred embodiment of the invention;

Fig. 2 is a longitudinal sectional view of the same, and

Fig. 3 is a transverse vertical sectional view on the line 3—3 of Fig. 2.

Referring more particularly to the drawing, in which like reference numerals refer to the same parts throughout the several views, 1 designates a lens barrel adapted to be positioned in an opening of a projection apparatus with the shoulder 2 against the front wall surrounding such opening, as usual with the conventional projection lens assembly, while 3 designates the rear lens mount for holding the usual lens system at the rear end of the barrel.

It has been found desirable to mount an iris diaphragm adjacent to the rear lens system and to control the diaphragm from a position at the front of the barrel adjacent to the front lens mount to be described presently, and according to the present invention, this objective is attained by providing an iris diaphragm indicated at 5 and preferably positioned immediately in front of the rear lens system. The diaphragm 5 is of conventional form and includes a control ring 6 suitably connected to the movable leaves of the diaphragm and rotatably arranged on the cylindrical support 7 that is spaced from the wall of the barrel and forms part of a mount 8 supported within the barrel 1 against a shoulder 9 and held fixedly in place by the threaded fastening ring 10. In order to position the cylindrical support 7 properly within the barrel when assembling, the flange 8 is slotted to engage a projection on a positioning screw 11 secured in an opening in the lens barrel.

The control ring 6 of the diaphragm is connected by means of a pin 12 to a rear cylindrical portion 13 of an operating member, said rear cylindrical portion being slotted endwise to engage the pin 12 while the cylindrical support 7 is slotted annularly to permit the movement of the pin 12 necessary to effect turning of the control ring 6 and opening or closing of the diaphragm.

The operating member includes the previously mentioned cylindrical rear portion 13, a cylindrical front portion 14, and a tapered sleeve-like body 15 which is connected to the cylindrical front portion 14 by means of a flange or shoulder 16.

The cylindrical front portion 14 of the operating member is seated against a corresponding cylindrical surface formed in the barrel, which has a shoulder 17 against which engages the flange or shoulder 16 of the operating member to limit endwise movement of the latter in one direction. Movement of the operating member forwardly is limited by the attaching portion 18 of the front lens mount which includes a lens supporting portion 19 that is spaced from the wall of the barrel and overlies the front cylindrical portion 14 of the operating member, and receives the front lens 20.

The lens is held in place by the threaded fastening ring 21, and the mount is held in place by the attaching portion 18 which is threaded exteriorly to engage the barrel and interiorly to receive the fastening ring 21. With this arrangement, the front cylindrical portion 14 of the operating member is properly supported and guided for uniformly smooth rotative adjustment between the cylindrical supporting surface of the barrel and the cylindrical lens supporting portion 19 of the front lens mount, affording a smooth action of the operating member and accurate, easy control of the diaphragm, while the parts are held with sufficient tightness to prevent excessive looseness or play while permitting the required movement for adjustment.

The operating member is turned by means of an adjusting ring 22 that is rotatable on the barrel and to this end engages a threaded portion on the exterior of the barrel at a point surrounding the front lens mount. The adjusting ring 22 is provided with a pin 23 extending through an arcuate slot 24 in the lens barrel and having its inner end engaging a longitudinal slot in the front cylindrical portion 14 of the operating member. The adjusting ring 22 carries suitable indicia on the bevelled edge 24 for cooperation with the index 25 to enable positioning it and to indicate the selected position of the diaphragm, which can thus be adjusted to any degree of opening by turning the operating ring 22.

This effects corresponding turning of the front cylindrical portion 14, the connecting sleeve-like body 15, and the rear cylindrical portion 13 which in turn rotates the control ring of the diaphragm and opens or closes the leaves of the latter. The rear edge of the adjusting ring 22 is spaced somewhat forwardly of the shoulder 2 to afford clearance between the adjusting ring and the adjacent surface of the front wall of the projection apparatus to permit the necessary turning of the adjusting ring on the lens barrel for controlling the diaphragm.

With this arrangement, the diaphragm can be located at the rear of the barrel immediately adjacent to the rear lens system and adjusted from a position at the front of the barrel, forwardly of the front wall of the projector apparatus, and surrounding the front lens mount, and the arrangement is such that the parts are securely held against excessive play and in a manner that insures a free, easy adjustment of the diaphragm at all times, and while the light intensity can be regulated by adjustment of the diaphragm, the location and arrangement of the operating mechanism is such as not to interfere with the normal passage of light from the rear lens system to the front lens system so that there is no resulting loss of light efficiency from the combining of the diaphragm controlling mechanism with the projection lens.

While the invention has been disclosed herein with reference to a particular embodiment, it is not confined to the details or arrangement set forth, and this application is intended to cover such modifications or changes as may come within the purposes of the improvement and the scope of the following claims.

I claim:

1. In a projection lens, the combination with an elongated lens barrel, a rear lens mount at the rear of the barrel, and a front lens mount at the front of the barrel of larger diameter than the rear lens mount, of an iris diaphragm located in front of and adjacent to said rear lens mount and including a control ring, the diaphragm being approximately the same diameter as the rear lens mount and of less diameter than the front lens mount, an operating member independent of the diaphragm and including a cylindrical rear portion surrounding said control ring, a pin carried by the control ring, said cylindrical rear portion of the operating member having a longitudinal slot engaging said pin, the operating member also including a cylindrical front portion of greater diameter than said rear portion and rotatably supported on the interior of the barrel adjacent to said front lens mount, an adjusting ring threaded and rotatable on the exterior of the barrel around the front lens mount and having a pin extending through an opening in the barrel, said cylindrical front portion of the operating member having a longitudinal slot engaging said pin, and an elongated tapering sleeve portion connecting said cylindrical front and rear portions of the operating member.

2. In a projection lens, the combination with an elongated lens barrel, a rear lens mount at the rear of the barrel, and a front lens mount at the front of the barrel of larger diameter than the rear lens mount, of an iris diaphragm located in front of and adjacent to said rear lens mount and including a control ring, the diaphragm being approximately the same diameter as the rear lens mount and of less diameter than the front lens mount, a mount for said diaphragm attached to the barrel and including a cylindrical support for the control ring spaced from the wall of the barrel, the control ring being seated and rotatable within said cylindrical support, an operating member independent of the diaphragm and including a cylindrical rear portion surrounding and rotatable on the exterior of said cylindrical support, a pin carried by the control ring and extending through an opening in said cylindrical support, said cylindrical rear portion of the operating member having a longitudinal slot engaging said pin, the operating member also including a cylindrical front portion of greater diameter than said rear portion and rotatably supported on the interior of the barrel adjacent to and surrounding a portion of said front lens mount, the barrel having an interior shoulder against which the rear edge of said cylindrical front portion of the operating member is seated while the front edge of said cylindrical front portion is retained by the front lens mount, an adjusting ring threaded and rotatable on the exterior of the barrel around the front lens mount and having a pin extending through an opening in the barrel, said cylindrical front portion of the operating member having a longitudinal slot engaging said pin, and an elongated tapering sleeve portion connecting the front and rear cylindrical portions of the operating member.

GEORGE K. CZARNIKOW.